(12) United States Patent
Van Eemeren et al.

(10) Patent No.: US 10,393,101 B2
(45) Date of Patent: Aug. 27, 2019

(54) MICROFLUIDIC DEVICE WITH VALVE

(71) Applicant: KONINKLIJKE PHILIPS N.V., Eindhoven (NL)

(72) Inventors: Johannes Theodorus Wilhelmus Maria Van Eemeren, Eindhoven (NL); Irene Johanna Monica Dobbelaer-Bosboom, Eindhoven (NL); Pieter Jan Van Der Zaag, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 292 days.

(21) Appl. No.: 14/911,480

(22) PCT Filed: Jul. 29, 2014

(86) PCT No.: PCT/EP2014/066216
§ 371 (c)(1),
(2) Date: Feb. 11, 2016

(87) PCT Pub. No.: WO2015/022176
PCT Pub. Date: Feb. 19, 2015

(65) Prior Publication Data
US 2016/0195085 A1 Jul. 7, 2016

(30) Foreign Application Priority Data
Aug. 12, 2013 (EP) ..................... 13180119

(51) Int. Cl.
*F04B 43/02* (2006.01)
*F04B 43/06* (2006.01)
(Continued)

(52) U.S. Cl.
CPC .......... *F04B 43/028* (2013.01); *F04B 43/043* (2013.01); *F04B 43/06* (2013.01);
(Continued)

(58) Field of Classification Search
CPC .. F04B 53/1072; F04B 43/028; F04B 43/043; F16K 99/0055; F16K 99/0015;
(Continued)

(56) References Cited

U.S. PATENT DOCUMENTS 5,542,821 A * 8/1996 Dugan ................. F04B 7/0076
417/322
5,718,567 A * 2/1998 Rapp ..................... F04B 43/043
417/395

(Continued)

FOREIGN PATENT DOCUMENTS

| JP | 2008008880 A | 1/2008 |
|---|---|---|
| WO | 2005111615 A1 | 11/2005 |
| WO | 2011048521 A1 | 4/2011 |

*Primary Examiner* — Charles G Freay

(57) ABSTRACT

A microfluidic device (100) comprising at least one passive valve (PV, 120, 130), the passive valve being constituted by a sequence of a first carrier layer (CL 1) with an aperture providing a passage (P 1) for fluid flow, a first binding layer (BLI) with a first opening, a flexible layer (FL) with a through-hole (TH), a second binding layer (BL2) with a second opening, and a second carrier layer (CL2). Moreover, the flexible layer (FL) can move within a valve chamber (VC) constituted by the openings. Depending on the pressure difference across the passive valve (PV), the flexible layer (FL) can bend towards the first carrier layer (CLI) and close the aperture, while it opens the passage (P1) when bending in the opposite direction. Two of such properly oriented passive valves together with an intermediate active valve (AV) can constitute a one-stroke pump. A method for manufacturing such a fluidic device is also disclosed.

19 Claims, 5 Drawing Sheets

(51) Int. Cl.
*F04B 43/04* (2006.01)
*F16K 99/00* (2006.01)

(52) U.S. Cl.
CPC ...... *F16K 99/0007* (2013.01); *F16K 99/0015* (2013.01); *F16K 99/0055* (2013.01); *F16K 99/0057* (2013.01); *F16K 2099/008* (2013.01); *F16K 2099/0094* (2013.01)

(58) Field of Classification Search
CPC ............. F16K 99/0057; F16K 99/0007; F16K 2099/008; F16K 2099/0094
See application file for complete search history.

(56) References Cited

U.S. PATENT DOCUMENTS

| | | | | |
|---|---|---|---|---|
| 6,033,191 A * | 3/2000 | Kamper | ................ | F04B 43/043 417/322 |
| 6,431,212 B1 * | 8/2002 | Hayenga | ................ | B01D 11/00 137/855 |
| 6,749,407 B2 * | 6/2004 | Xie | ................ | F04B 43/046 137/15.18 |
| 6,921,253 B2 * | 7/2005 | Shuler | ................ | F04B 43/043 417/413.2 |
| 7,195,026 B2 * | 3/2007 | Znamensky | ................ | B01J 4/02 137/15.04 |
| 7,284,966 B2 * | 10/2007 | Xu | ................ | F04B 19/006 417/395 |
| 7,299,815 B2 * | 11/2007 | Yamanishi | ................ | F04B 19/006 137/15.18 |
| 7,942,160 B2 | 5/2011 | Jeon | | |
| 8,382,452 B2 * | 2/2013 | Richter | ................ | F04B 43/043 417/413.1 |
| 8,987,684 B2 | 3/2015 | Wimberger-Friedl | | |
| 2002/0128593 A1 | 9/2002 | Hansson | | |
| 2002/0155010 A1 | 10/2002 | Karp | | |
| 2004/0052657 A1 * | 3/2004 | Van Lintel | ................ | F04B 43/043 417/322 |
| 2004/0262210 A1 | 12/2004 | Westervelt et al. | | |
| 2005/0158188 A1 * | 7/2005 | Matsui | ................ | F04B 43/043 417/410.1 |
| 2005/0224351 A1 | 10/2005 | Unger | | |
| 2008/0063543 A1 | 3/2008 | Xu | | |
| 2010/0243078 A1 | 9/2010 | Yoo | | |
| 2011/0151578 A1 | 6/2011 | Abate | | |
| 2012/0206547 A1 | 8/2012 | Shirotori | | |
| 2014/0294629 A1 * | 10/2014 | Kim | ................ | F04B 43/043 417/413.2 |

* cited by examiner

MICROFLUIDIC DEVICE WITH VALVE

CROSS-REFERENCE TO PRIOR APPLICATIONS

This application is the U.S. National Phase application under 35 U.S.C. § 371 of International Application No. PCT/EP2014/066216, filed on Jul. 29, 2014, which claims the benefit of European Patent Application No. EP13180119.3, filed on Aug. 12, 2013. These applications are hereby incorporated by reference herein.

FIELD OF THE INVENTION

The invention relates to a fluidic device with at least one passive valve, particularly in the form of a micro fluidic cartridge. Moreover, it relates to a method for manufacturing such a fluidic device.

BACKGROUND OF THE INVENTION

The U.S. Pat. No. 7,942,160 B2 discloses microfluidic systems comprising a valve in a fluid path having an inlet and an outlet. A closing member in the fluid path blocks the inlet in its relaxed state and when the direction of fluid flow changes.

SUMMARY OF THE INVENTION

It would be desirable to have alternative designs of a passive valve and a microfluidic device, particularly designs having a high robustness and reliability and/or that can readily be manufactured.

A fluidic device according to an embodiment of the invention may particularly be designed and dimensioned for the processing of small volumes of a fluid, particularly volumes of less than about 100 µl or even less than 10 µl. The device may therefore also be called "microfluidic device". It may particularly be designed as a cartridge in which measurements with a sample fluid such as a biological liquid can be made. The fluidic device comprises at least one passive valve having the following sequence of layers:

a) A layer that is called "first carrier layer" in the following and that has an aperture which provides a (first) passage for a fluid.

b) An optional layer that is called "first binding layer" in the following and that has a "first opening".

c) A "flexible layer" with at least one through-hole.

d) An optional "second binding layer" with a "second opening". At least one of the first binding layer and the second binding layer shall be present.

e) A "second carrier layer".

Moreover, the design and arrangement of these layers shall be such that pushing the flexible layer towards the first carrier layer closes the passage while pushing it towards the second carrier layer (CL2) opens the passage (P1).

The aforementioned pushing of the flexible layer is to be understood as a pushing exerted by fluid in the fluidic system, the direction of the pushing depending on the pressure distribution in the fluid. The pushing will usually only affect a part of the flexible layer that is exposed to the fluid, particularly a part around the through-hole. When opened, the passage will usually be continued in some way via the through-hole in the flexible layer.

The term "passive valve" shall denote a unit that changes its flow resistance in a flow channel of a fluid depending on the flow direction (or the sign of the pressure difference across the unit), wherein this change is solely induced by the fluid itself without the application of external energy or control. Typically, the passive valve is a one-way valve or non-return valve allowing fluid flow only in one direction ("forward") and blocking when pressure is such that fluid flow would be reversed.

The layers of the fluidic device are preferably disposed directly one upon the other without further intermediate layers in between. Embodiments in which one or more intermediate layers are present shall however be comprised by the invention, too.

The "openings" of the first and second binding layers are preferably cutouts of these layers, i.e. holes going through the whole layer thickness. The openings are usually bigger in size than the aperture in the first carrier layer and the through-hole in the flexible layer.

The term "layer" shall in general refer to an element or unit having a flat geometry with a width and a length that are substantially larger than its thickness. Moreover, the thickness is preferably unique across the whole layer, though layers with thickness variations are comprised by the invention, too. Thickness variations may for instance be used to realize fluidic structures such as flow channels or processing chambers.

The described fluidic device has the advantage to provide a simple design of a passive valve, requiring only a sequence of layers with openings or through-holes that are appropriately dimensioned and aligned. Moreover, the valve function is provided by the bending of a flexible layer, wherein the bending portion of this layer can be located spaced apart from adjacent layers in its relaxed state due to the binding layer(s) serving as spacer(s). Thus a high reliability of the valve can be achieved because the relaxed flexible layer cannot accidentally stick to a contacting layer, which might ruin a correct valve function.

In the following, various preferred embodiments of the invention will be described in more detail.

Preferably a chamber that is called "valve chamber" in the following is formed by the first and/or the second openings of the binding layers such that this valve chamber provides a cavity in which a part of the flexible layer around the through-hole (TH) can move.

The through-hole or at least one of the through-holes of the flexible layer, if there are several, is preferably located close to the border of the aforementioned valve chamber. The through-hole is then close to a fixation point of the flexible layer (between the adjacent layers), implying that the through-hole is substantially at rest.

The aperture of the first carrier layer is preferably located close to the center of the above mentioned valve chamber, i.e. to the first opening in the first binding layer and/or the second opening in the second binding layer. At this position, the flexible layer has maximal freedom for bending movements (towards the first carrier layer) and can therefore most easily reach the aperture and close it, thus interrupting fluid flow in the passage.

The (first) passage provided by the aperture in the first carrier layer is usually continued by the through-hole and some "second passage" behind the passive valve. One possibility to realize such a second passage is the provision of a through-hole in the second carrier layer. Further movement and processing of the fluid that has passed the passive valve will then take place on the downstream side of the second carrier layer.

In another embodiment, the second passage may be provided by an aperture in the flexible layer (wherein the term "aperture" has been chosen to distinguish this component from the through-hole of the flexible layer; technically, there shall be no substantial difference between a "through-hole" and an "aperture"). Through this aperture, fluid that has passed through the through-hole of the flexible layer can return, allowing for a design in which processing of the fluid substantially takes place on one side of the flexible layer.

In general, the layers of the fluidic device may be made from any material that is suited for the purpose at hand, such as glass or Si, although for costs and manufacturing reasons polymers are preferred. The first carrier layer and/or the second carrier layer may for example comprise a material selected from the group consisting of poly(methyl methacrylate) (PMMA), polytetrafluoroethylene (PTFE) and/or polycarbonate (PC). In addition PP, PE and polyester could be used.

As their name indicates, the binding layers are typically used to connect two layers to each other, providing some spacing between them. Accordingly, the first binding layer and/or the second binding layer may preferably comprise a pressure-sensitive adhesive or a double-sided tape. Typically, a binding layer may have a polymer carrier (such as polyester, polyethylene, polyolefin, polyurethane) or even Al-foil in addition to adhesive layers such as acrylic adhesive, epoxy glue, or silicon rubber.

The flexible layer is made from a material having a sufficient flexibility and elasticity to allow for the required bending within the valve chamber. The flexible layer may comprise a flexible rubber such as TPEs (thermoplastic elastomers) or latex.

The overall fluidic device will typically comprise more units and elements than just the passive valve. It may for example comprise further passive and active valves, pumping elements, channels, chambers, fluid inlets or outlets and the like. In a preferred embodiment, it comprises two or more passive valves of the kind described above, wherein said valves share at least one layer of the group consisting of the carrier layers, the binding layers, and the flexible layer. The usage of at least one of these layers for the constitution of at least one more passive valve (at a different location in the plane of the layers) allows for a particularly economic design.

In a preferred variant of the aforementioned embodiment, at least two passive valves are formed by the same carrier layers, binding layers and flexible layer at different locations of said layers. Thus a given set of layers is optimally exploited for generating a desired number of passive valves. All that has to be done is to provide the layers with appropriate passages, apertures, through-holes and openings that are aligned at different locations to constitute the required passive valves.

According to another embodiment, the fluidic device comprises additionally an active valve with a pumping chamber having an inlet and an outlet for fluid, wherein the volume of said chamber can controllably be changed (enlarged and diminished). As the name "active valve" indicates, the volume changes are typically induced by the application of some external force or energy acting on an element of the valve. The controlled change of the volume of the pumping chamber can be used to actively pump fluid through the fluidic device.

In a further development of the aforementioned embodiment, a first passive valve of the kind described above is disposed upstream of the active valve, and a second passive valve of the kind described above is disposed downstream thereof. With an appropriate orientation of these passive valves (i.e. of their flow-through directions) it can be achieved that the first passive valve is open for the inflow of fluid when the pumping chamber is enlarged while the second passive valve simultaneously blocks the outflow. During a decrease of the volume of the pumping chamber, pressure differences across the passive valves will change in sign, inducing a reversal of the associated opening states. Thus the second passive valve will open to allow for the efflux of fluid, while the first passive valve closes to prevent inflow into the pumping chamber. In summary, the arrangement of first passive valve, active valve, and second passive valve realizes a functional pumping unit with a simple design, using just a single active element.

The active valve can be realized in many different ways. In a preferred embodiment, at least one border of the pumping chamber is formed by a flexible wall. Inward or outward bending of the flexible wall can then change the volume of the pumping chamber while simultaneously keeping it tightly sealed. The flexible wall can typically be realized from the same material as the flexible layer.

The aforementioned flexible wall of the active valve is preferably in communication to the outside of the fluidic device and can be coupled to a pressure controller. Arbitrary pressures can then be applied to this side of the flexible wall under the control of a user, allowing deflection of the flexible wall as desired.

In a preferred embodiment, the flexible wall of the pumping chamber is constituted by a part of the flexible layer of the passive valve. This allows for an economic design with a small total number of layers. Most preferably, different parts of one single flexible layer may be used in two passive valves and the active valve.

In another preferred embodiment, the pumping chamber of the active valve is formed in a layer different from the carrier layers, the binding layers, and the flexible layer of the associated passive valves. Thus the size of the pumping chamber can be chosen independently from the sizes of the passive valves, allowing particularly for the design of a large pumping volume.

According to an independent aspect, an embodiment of the invention relates to a fluidic device that is composed of a stack of layers (such as the fluidic devices described above, but also in devices of other designs), said fluidic device comprising:

An active valve having a pumping chamber, wherein the volume of said pumping chamber can controllably be changed.

A first passive non-return valve that is arranged to allow for an inflow of fluid into the pumping chamber only.

A second passive non-return valve that is arranged to allow for an outflow of fluid from the pumping chamber (PC) only.

Furthermore, the fluidic device shall be designed such that the pumping chamber is formed in a layer different from the layers in which the first and second passive non-return valves are formed.

By arranging the passive valves on the one hand side and the (pumping chamber of) the active valve on the other hand side in different layers, their in-layer sizes can be chosen independently of each other. This allows for a particularly compact design with a small footprint of the cartridge.

The invention further relates to an embodiment of a method for manufacturing a fluidic device of the kind described above, said method comprising the following steps which can be executed in the listed or any other appropriate order:

Cutting an aperture into a first carrier layer.

Cutting an opening into at least one of a first and a second binding layer.

Cutting at least one through-hole into a flexible layer.

Laminating the above cut layers onto each other.

The design of the fluidic device hence allows for a cost efficient mass production as it just requires an appropriate cutting of several layers and the later lamination of these layers onto each other with a proper alignment.

Additionally or alternatively, at least some parts of the fluidic device may be produced by injection molding. Furthermore, adjacent layers may be attached to each other by other means than an intermediate binding layer, for example by laser welding.

BRIEF DESCRIPTION OF THE DRAWINGS

These and other aspects of the invention will be apparent from and elucidated with reference to the embodiments described hereinafter.

In the drawings.

Like reference numbers or numbers differing by integer multiples of 100 refer in the Figures to identical or similar components.

DETAILED DESCRIPTION OF EMBODIMENTS

The embodiments of the invention to be described in the following relate to the transport of liquid in cartridges that are for instance used in biomedical applications. Transport in these cartridges can be done by peristaltic pumping using three active valves in series which can be opened and closed by pneumatically actuating each valve. For a large number of transport steps that are needed to execute a typical biochemical process on a cartridge a large number of such valves is needed, each valve requiring a pneumatic actuator and a digital output channel. Due to the limited space and the limited amount of output channels, there is a maximal amount of transport steps that can be integrated. Hence, for further integration improvements are needed.

To address these issues, it is proposed here to pump liquid by means of actuating a single active valve only in combination with two non-return valves before and after said active valve. By actuating the active valve, the two passive non-return valves are also actuated by the flow of the liquid. The pump mechanism is favorably designed in a stacked/laminated cartridge technology. One aspect in the design is an asymmetry between the passive valves in the way their membrane is connected to the active valve and the in- and output channel. With this asymmetry an opposite movement that is needed for pumping can be obtained.

Figure 1:
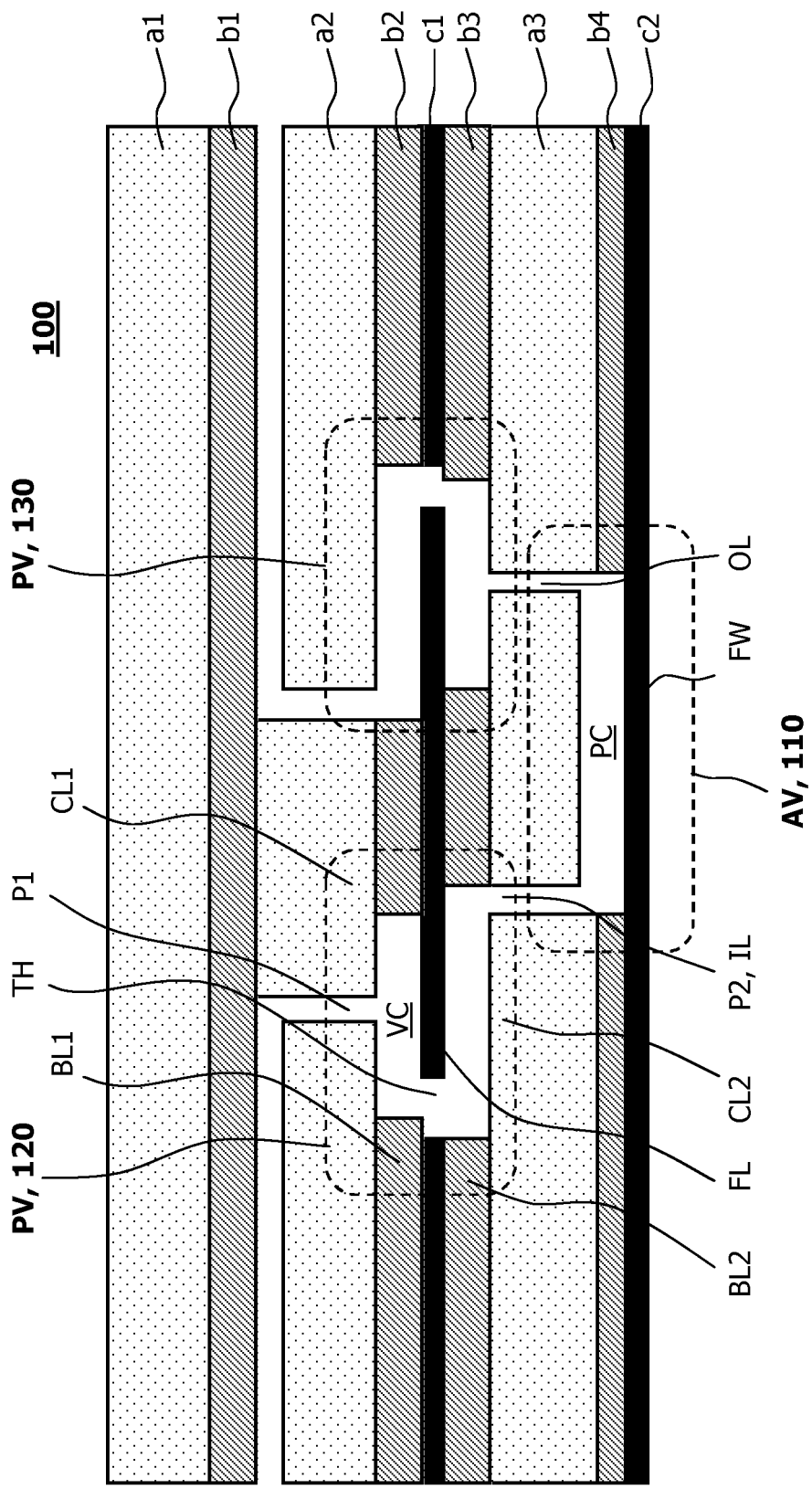
FIG. 1 schematically shows a section through the layers of a first microfluidic device according to an embodiment of the invention, said device comprising an active valve between two passive valves.

FIG. 1 schematically illustrates a microfluidic device 100 according to a first embodiment of the invention. All micro fluidic devices described in the following have a design comprising a sequence of carrier layers, made e.g. from PMMA, wherein each carrier layer is denoted in the Figures by a small letter "a" together with a number indicating its position in the stack of layers (starting at the top). The first microfluidic device 100 has for example three carrier layers a1, a2, and a3. The carrier layers typically have a thickness ranging between about 0.1 mm and about 10 mm, preferably between about 0.5 mm and about 6 mm, or between about 1 mm and about 4 mm. Holes, apertures, or recesses in the carrier layers may be provided as desired to implement microfluidic structures such as fluid channels, chambers and the like.

The microfluidic devices further comprise flexible layers that are denoted in the Figures by small letters "c" together with a number indicating their position in the stack of layers. The microfluidic device 100 comprises for example two flexible layers c1 (between a2 and a3) and c2 (at the bottom side of the device). A flexible layer may for example consist of a flexible rubber such as an olefinic elastomer on PP basis.

Furthermore, a binding layer is provided between each two of the above mentioned carrier layers and flexible layers. The binding layers are denoted by a small letter "b" with a number corresponding to their position in the stack. The binding layers may be constituted by double sided tape or pressure-sensitive adhesive (with polyester carrier, e.g. Nitto Denko 5015P).

The microfluidic device 100 hence comprises the following sequence of layers (from the top): a1-b1-a2-b2-c1-b3-a3-b4-c2.

FIG. 1 further shows that three valves are arranged in series in a fluid path, namely:

A first passive valve, denoted by the general reference sign "PV" and the individual reference sign "120".

An active valve, denoted by the general reference sign "AV" and the individual reference sign "110".

A second passive valve, denoted by "PV" or "130".

The design of the first passive valve 120 will now we described in more detail. General reference signs with capital letters will be used for this purpose to emphasize the common aspects of the passive valves (the structural components of individual valves can be realized by different individual layers of the stack). The first passive valve PV comprises a sequence of the following components:

a) A first carrier layer CL1 comprising an aperture that provides a first passage P1 for fluid flow. The aperture is continued on its upstream side in some channel or the like which is of no particular interest in this context.

b) A first binding layer BL1 having a large opening at the center of which the aperture of the passage P1 is located.

c) A flexible layer FL with a through-hole TH.

d) A second binding layer BL2 having a second large opening substantially corresponding to the first opening in the first binding layer. The first and second openings in the binding layers constitute together a valve chamber VC in which a piece of the flexible layer FL is freely suspended, allowing for a bending of the central portion of this piece. The through-hole TH of the flexible layer FL is preferably located close to a border of the valve chamber, guaranteeing that it is substantially at rest.

e) A second carrier layer CL2.

A second passage P2 is in fluid communication with the second opening in the second binding layer BL2, i.e. with the valve chamber VC. In this embodiment, the second passage P2 is realized by an aperture in the second carrier layer CL2.

The second passive valve PV 130 has substantially the same design, wherein the above described components are however arranged in an anti-symmetric manner. The second passive valve 130 hence has the following sequence of layers:
- a first carrier layer a3;
- a first binding layer b3;
- a flexible layer c1;
- a second binding layer b2;
- a second carrier layer a2.

FIG. 1 further shows an active valve AV (or 110) that is disposed in the fluid path between the first passive valve 120 and the second passive valve 130. The active valve AV comprises a flexible wall FW that constitutes one border of a pumping chamber PC. The pumping chamber PC has an inlet IL for the inflow of fluid and an outlet OL for the outflow, wherein the inlet IL is simultaneously the second passage P2 of the first passive valve 120, and the outlet OL is simultaneously the first passage P1 of the second passive valve 130.

The volume of the pumping chamber PC can be enlarged or decreased by bending of the flexible wall FW, wherein said bending can controllably be induced by applying an appropriate positive pressure $e_{pos}$ or negative pressure $p_{neg}$ from a pressure source PS.

Figure 2:
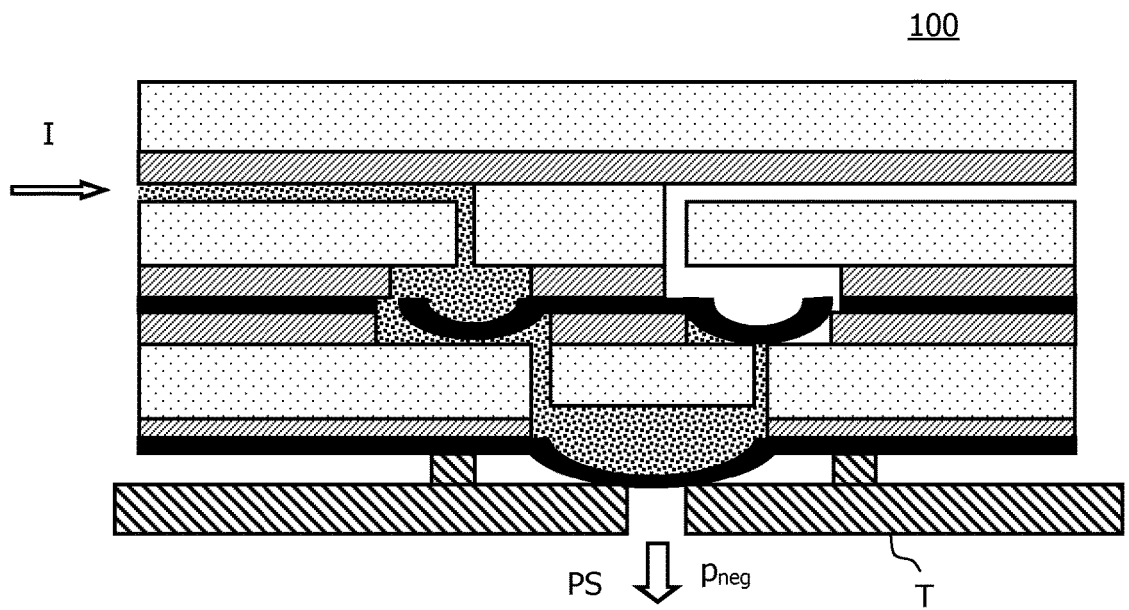
FIG. 2 illustrates the inflow of fluid into the first microfluidic device.

FIG. 2 shows that the pressure source PS may for example be located in a table T that carries the microfluidic device 100 and may be coupled to the flexible wall FW by some vacuum connection. Moreover, the Figure illustrates a first phase of the operation of the one stroke pump PV-AV-PV that is constituted by the sequence of first passive valve 120, active valve 110, and second passive valve 130. During this first phase, a negative pressure $p_{neg}$ (with respect to the pressure of the fluid in the device 100) is applied at the outside of the flexible wall FW, inducing an outward bending of this wall. The volume of the pumping chamber PC is hence increased and the pressure within it decreases, which induces a downward bending of the flexible layers in the first and second passive valves 120, 130. In the first passive valve 120, this downward bending does not interrupt the fluid connection between the first passage P1 and the second passage P2 of this valve. A fluid inflow I can therefore enter through the first passage and pass on to the pumping chamber PC. In the second passive valve 130, the downward bending of the flexible layer will instead close the first passage of this valve, which is identical to the outlet OL of the active valve AV. This prevents the entrance of fluid into the pumping chamber PC through the second valve 130. In summary, the left non-return valve 120 opens and the right non-return valve 130 closes (due to the asymmetry between these valves), and as a result the pumping chamber PC is filled with liquid from the input of the one stroke pump.

Figure 3:
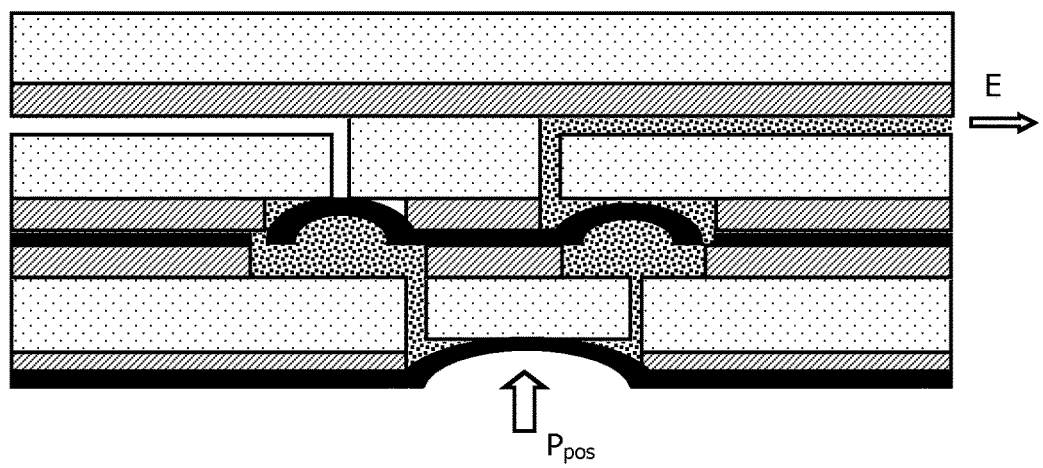
FIG. 3 illustrates the outflow of fluid from the first microfluidic device.

FIG. 3 illustrates the next phase, in which a positive pressure $e_{pos}$ (with respect to the pressure of the fluid in the device 100) is applied to the outside of the flexible wall FW. The flexible wall hence bends inwards, thus decreasing the volume of the pumping chamber PC and increasing the pressure therein. This induces an upward bending of the flexible layer in the passive valves. Now the upward bending of the flexible layer FL in the first passive valve 120 closes the first passage P1 and thus prevents the reflow of fluid into this passage. In the second passive valve 130, the upward bending of the flexible layer does instead not affect the communication between the first and second passages of this valve. Accordingly, fluid from the pumping chamber PC of the active valve AV can pass through the second passive valve 130 and leave the one stroke pump as an outflow E. In summary, the left non-return valve 120 closes and the right non-return valve 130 opens, and as a result the pumping chamber PC is emptied and the liquid is pressed via the right non-return valve to the output of the one stroke pump.

In other designs, three valves are used for pumping that must be actuated externally by vacuum and pressure. In the described approach just one active valve AV is used that is actuated externally by pressure ($e_{pos}$) and vacuum ($p_{neg}$). The vacuum and pressure may be applied via the instrument's table T. The two passive non-return valves PV in the middle of the stack are actuated internally by the movement of the active bottom valve AV. For a liquid flow from the input to the output it is important that the volume of the active bottom valve's pumping chamber PC is larger than the volumes of the valve chambers VC of the two passive valves 120 and 130 together. The volume of the pumping chamber PC can be realized by the diameter and height of the hole that is patterned in the binding layer b4 that forms this chamber. It is also possible to make a hole in the instrument's table T that allows the bottom elastic foil c2 to expand downwards for creating a large pump volume.

The described design of the fluidic device can be modified in many ways.

Figure 4:
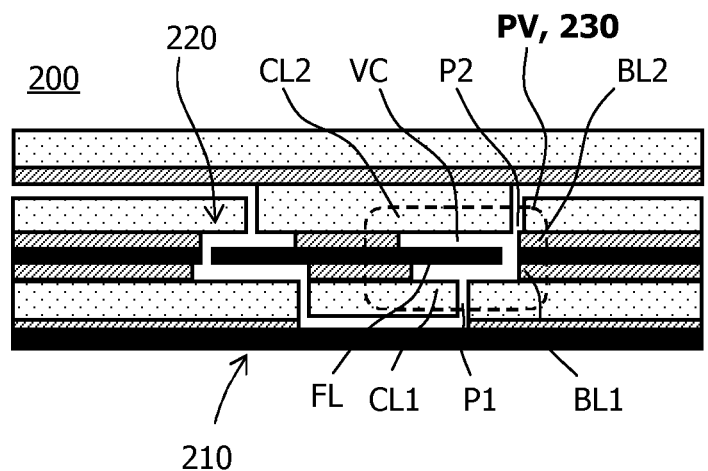
FIG. 4 shows a second microfluidic device that corresponds to the first one with a modified design of the second passive valve.

FIG. 4 shows for example a fluidic device 200 that is identical to the device 100 except for another position of the second passage P2 of the second passive valve 230. The components of the second passive valve 230 are denoted by the general reference signs in this Figure.

Figure 5:
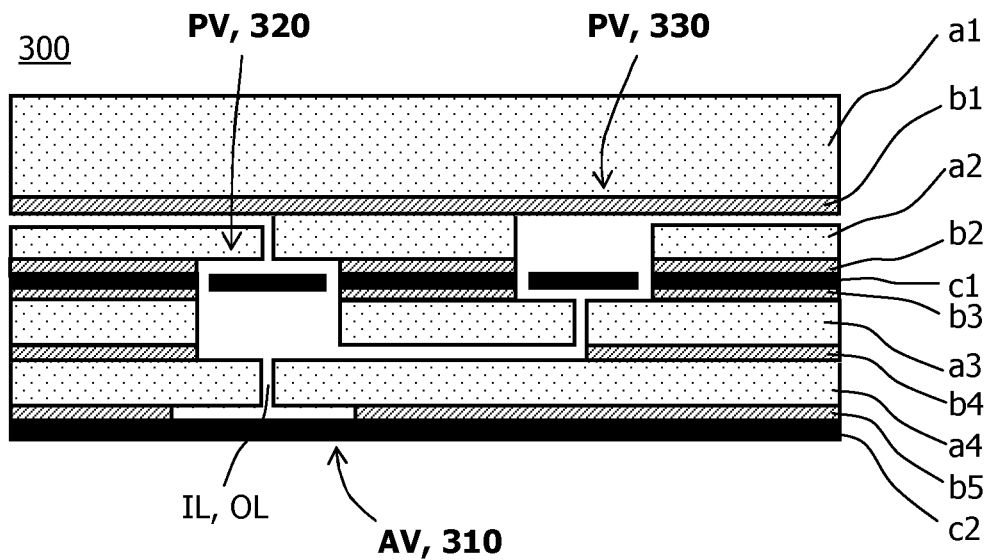
FIG. 5 shows a third microfluidic device comprising passive valves with enlarged valve chambers.

FIG. 5 shows a fluidic device 300 that uses a number of extra layers. The valve chambers of the first passive valve 320 and the second passive valve 330 are increased by an additional recess in the carrier layer at the second passage (i.e. the carrier layer a3 for the first and the carrier layer a2 for the second passive valve). Moreover, the pumping chamber of the active valve 310 is connected via a single combined inlet/outlet channel IL/OL to the passive valves.

Figure 6:
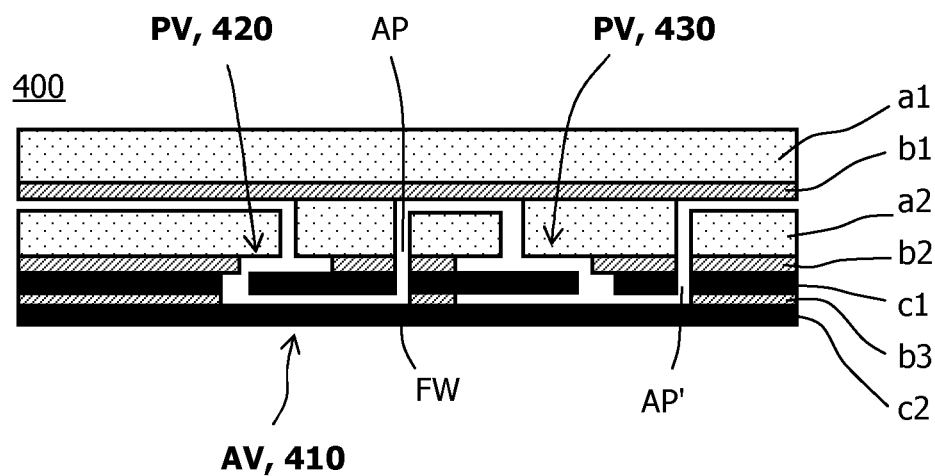
FIG. 6 shows a fourth microfluidic device in which the flexible wall of the active valve simultaneously constitutes the second carrier layer of the passive valves.

FIG. 6 shows a fluidic device 400 that uses a minimum number of extra layers, just one extra tape b3 and elastic layer c2 at the bottom. With other words, the flexible wall FW of the active valve AV simultaneously constitutes a carrier layer of the passive valves. The design further comprises an aperture AP in the flexible layer FL that allows for a return of fluid, which has passed from the top side of this layer to the bottom side via the first passive valve 420, back to the top side. The fluid can then enter the second passive valve from the top. A second aperture AP' in the flexible layer FL allows for a second return of the fluid to the top side, where it is forwarded to other microfluidic structures.

Figure 7:
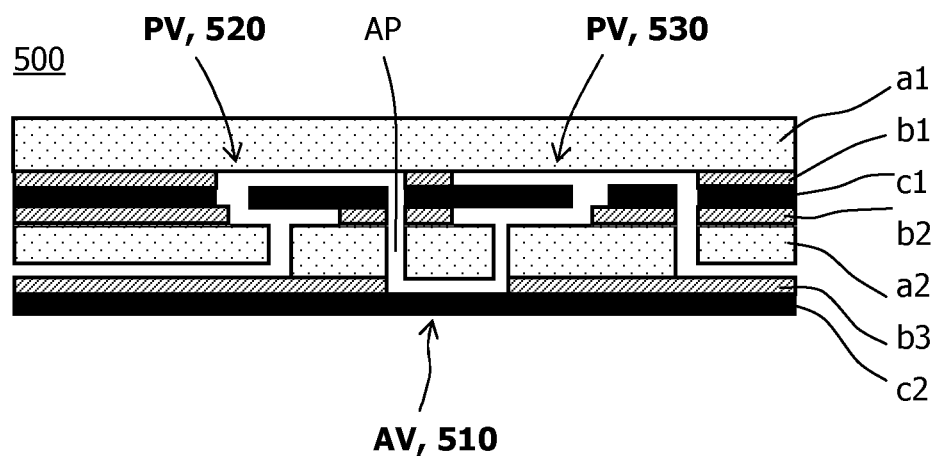
FIG. 7 shows a fifth microfluidic device in which the flexible layer has an aperture through which fluid can pass.

FIG. 7 shows a fluidic device 500 that also uses just a single structured carrier layer (a2), wherein the passive valves 520, 530 are now disposed above this layer.

As only a single carrier layer (a2) has to be structured in the microfluidic devices 400 and 500, these designs are easy to manufacture.

Figure 8:
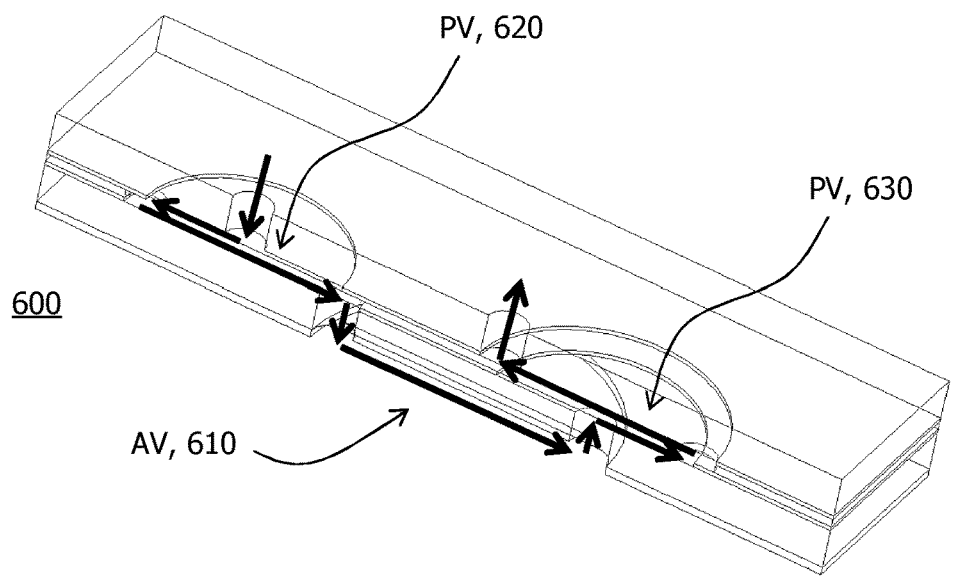
FIGS. 8 and 9 show perspective views of a sixth microfluidic device.
Figure 9:
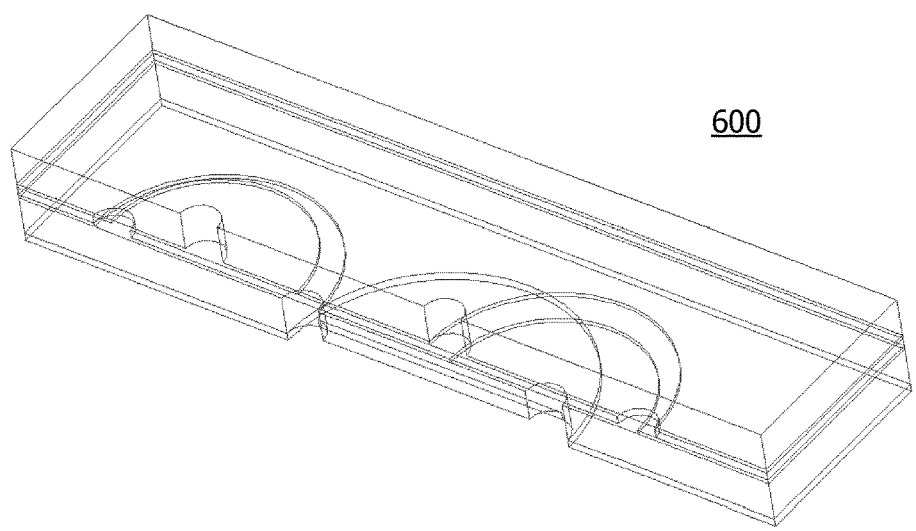

FIGS. 8 and 9 show in different perspective views a cross section through a microfluidic device 600 comprising a one stroke pump (the flexible layer/wall at the bottom is not depicted). The fluid path through the valves is shown by arrows. It can be seen that circular valve chambers are generated by respective openings in the binding layers.

Figure 10:
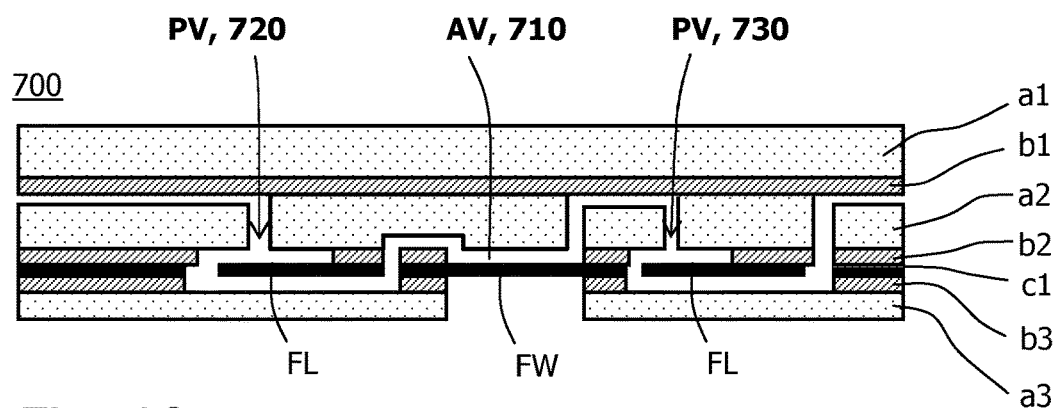
FIG. 10 shows a seventh embodiment of a microfluidic device in which the active and passive valves share a common flexible layer.

FIG. 10 illustrates a further embodiment of a microfluidic device 700 with a series of a first passive valve 720, an active valve 710, and a second passive valve 730. In contrast to the embodiments described above, the flexible wall FW of the pumping chamber of the active valve AV is constituted by the same flexible layer FL that is also used in the two passive valves PV. Thus a design can be achieved with a minimal number of layers, which is favorable in view of a mass production of such cartridges.

The microfluidic devices or cartridges described above may be produced from several layers of PMMA (carrier layer), double sided adhesive/tape (binding layer), and an elastic membrane (flexible layer). In a preferred manufacturing method, these layers are first patterned, e.g. by laser cutting. Next, by laminating the layers onto each other a 3D microfluidic cartridge can be made.

Additionally or alternatively, at least some components of the microfluidic device may be manufactured by injection molding. This is particularly refers the case for the carrier layers. In injection molding a great range of polymers can be used (e.g. ABS, PS, PC, PP, PE, PMMA, PET, PEN, PEEK, COC, COP and POM). When injection molding is applied, binding layers between carrier layers will usually not be necessary. Binding layers may however be needed to attach the flexible layer(s). Additionally or alternatively, a flexible layer may be fixed to an adjacent layer by laser welding.

The use of passive valves makes it possible to decrease the channel paths between chambers and liquid reservoirs. The path can be decreased by a factor of 3 (e.g. from about 36 mm in designs with three active valves to about 10 mm in the described design, which corresponds to a reduction of dead volume from 1.8 µl to 0.5 µl per pump unit for typical channel dimensions). The number of transport steps on a cartridge can then be increased. Hereby the dead volume of the liquid is reduced which is crucial when small amounts (e.g. of around 10 µl) of liquid have to be transported. The dimensions of the cartridge are mostly defined by the total number of valves that are needed. When fewer valves are needed the cartridge dimensions can be decreased accordingly.

In summary, embodiments of a single stroke valve have been described in which by a combination of a single active valve and two passive valves a pumping action is achieved. The way a flexible membrane moves (closes) in the valve structure is used to create an asymmetry between the two passive valves such that a pumping action is achieved with only a single active valve, i.e. fluid will move in a preset direction only. An advantage of this technology is a further reduction of the cartridge size as less active valves are needed to achieve pumping. Thus more functions can be integrated in the same area and/or the "dead volume" can be reduced, which reduces unwanted carry-over of a reagent into the next process step. This typically results in cost saving of expensive reagents such as enzymes or FISH probes and plays an important role in e.g. sequencing and molecular pathology.

The described pumps can for example be applied in lab-on-a-chip devices. They can be integrated into a technology building a cartridge from layers. PMMA and double sided tape layers and a flexible membrane layer can be laser cut and then laminated onto each other to a 3D microfluidic cartridge.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A fluidic device, including
a first and a second passive valve, each passive valve having a passage for fluid and comprising the following sequence of layers:
a first carrier layer with an aperture providing a first part of the passage for fluid;
a flexible layer including at least one through-hole and an aperture formed therein, wherein the passage for fluid is continued from the aperture of the first carrier layer through the through-hole of the flexible layer and then through the aperture of the flexible layer in that order;
at least one binding layer with an opening;
a second carrier layer;
wherein the flexible layer is configured to close the passage of the passive valve when moved towards the first carrier layer and is configured to open the passage of the passive valve when moved towards the second carrier layer; and
an active valve having a pumping chamber with an inlet and an outlet, the inlet of the pumping chamber being connected to the passage of the first passive valve and the outlet of the pumping chamber being connected to the passage of the second passive valve;
wherein a volume of said pumping chamber is adjustable, and wherein the first passive valve is located upstream and the second passive valve is located downstream of the active valve.

2. The fluidic device according to claim 1, wherein a part of the flexible layer at the through-hole of each passive valve is movable within a valve chamber that is formed by the opening of each passive valve.

3. The fluidic device according to claim 2, wherein the at least one through-hole of the flexible layer of each passive valve is located adjacent a border of the valve chamber.

4. The fluidic device according to claim 2, wherein the aperture of the first carrier layer of each passive valve is located adjacent a center of the valve chamber.

5. The fluidic device according to claim 1, wherein the first carrier layer and/or the second carrier layer of each passive valve comprises a material selected from the group consisting of poly(methyl methacrylate) (PMMA), polytetrafluoroethylene (PTFE), and polycarbonate (PC).

6. The fluidic device according to claim 1, wherein the at least one binding layer of each passive valve further includes a first binding layer having a first opening and a second binding layer having a second opening, the first binding layer and/or the second binding layer of each passive valve comprising a carrier element with adhesive layers comprised of acrylic adhesive or silicon rubber.

7. The fluidic device according to claim 1, wherein the flexible layer of each passive valve comprises a thermoplastic elastomer.

8. The fluidic device according to claim 1, further comprising two or more such passive valves that share at least one of the carrier layers, binding layers, or the flexible layer.

9. The fluidic device according to claim 1, wherein a border of the pumping chamber is formed by a flexible wall, wherein said flexible wall is a part of the flexible layer of either the first passive valve or the second passive valve.

10. The fluidic device according to claim 1, further including a pressure source disposed adjacent the active valve and configured to apply pressure to the active valve to adjust the volume of the pumping chamber.

11. A fluidic device that is composed of a stack of layers, the device comprising:
an active valve having a pumping chamber, wherein the volume of said pumping chamber is adjustable with an associated pressure source disposed adjacent thereto;
a first passive non-return valve that is arranged to allow for an inflow of fluid into the pumping chamber only, the first passive-non return valve including a carrier layer with an aperture extending therethrough;
a second passive non-return valve that is arranged to allow for an outflow of fluid from the pumping chamber only, the second passive-non return valve including a carrier layer with an aperture extending therethrough;
wherein the pumping chamber is formed in a layer different from the layers in which the first and second passive non-return valves are formed;
wherein an inlet of the pumping chamber is connected to a passage of the first passive non-return valve and an outlet of the pumping chamber is connected to a passage of the second passive non-return valve;
wherein the first passive non-return valve and the second passive non-return valve includes a flexible layer and the passage of each of the first passive non-return valve and the second passive non-return valve includes (i) at least one through-hole defined in the flexible layer and (ii) an aperture defined in the flexible layer; and
wherein the passage of each of the first passive non-return valve and the second passive non-return valve passes through the aperture in the first carrier layer and then through the at least one through-hole of the flexible layer- and then through the aperture of the flexible layer in that order.

12. The fluidic device according to claim 11, wherein the first and second passive non-return valves each comprise:
a first carrier layer with an aperture providing a first part of the passage of the passive non-return valve;
said flexible layer with the at least one through-hole and the aperture through which the passage of the passive non-return valve is continued wherein the passage of the passive non-return valve includes both the at least one through-hole of the flexible layer and the aperture of the flexible layer;
a second carrier layer wherein the flexible layer is disposed between the first carrier layer and the second carrier layer; and
binding layers disposed between the first carrier layer and the flexible layer and between the second carrier layer and the flexible layer wherein the binding layers space the flexible layer apart in its relaxed state from the first carrier layer and the second carrier layer;
wherein the flexible layer is configured to close the passage of the passive non-return valve when moved towards the first carrier layer and configured to open the passage of the passive non-return valve when moved towards the second carrier layer; and
wherein the first passive non-return valve is located upstream and the second passive non-return valve is located downstream of the active valve.

13. The fluidic device according to claim 12, wherein a part of the flexible layer at the through-hole of both passive non-return valves is movable within a valve chamber that is formed by openings formed in the binding layers of both passive non-return valves.

14. The fluidic device according to claim 13, wherein the at least one through-hole of the flexible layer of both passive non-return valves is located adjacent a border of the valve chamber.

15. The fluidic device according to claim 13, wherein the aperture of the first carrier layer of both passive non-return valves is located adjacent a center of the valve chamber.

16. The fluidic device according to claim 12, wherein the at least one binding layer of both passive non-return valves further includes a first binding layer having a first opening and a second binding layer having a second opening, the first binding layer and/or the second binding layer of both passive non-return valves comprising a carrier element with adhesive layers comprised of acrylic adhesive or silicon rubber.

17. The fluidic device according to claim 12, wherein the flexible layer of both passive non-return valves comprises a thermoplastic elastomer.

18. The fluidic device according to claim 12, further comprising two or more such passive valves that share at least one of the carrier layers, binding layers, or the flexible layer.

19. The fluidic device according to claim 12, wherein a border of the pumping chamber is formed by a flexible wall, wherein said flexible wall is a part of the flexible layer of either the first passive non-return valve or the second passive non-return valve.

* * * * *